W. R. Waldron,
Derrick.
Nº 65,316.  Patented May 28, 1867.
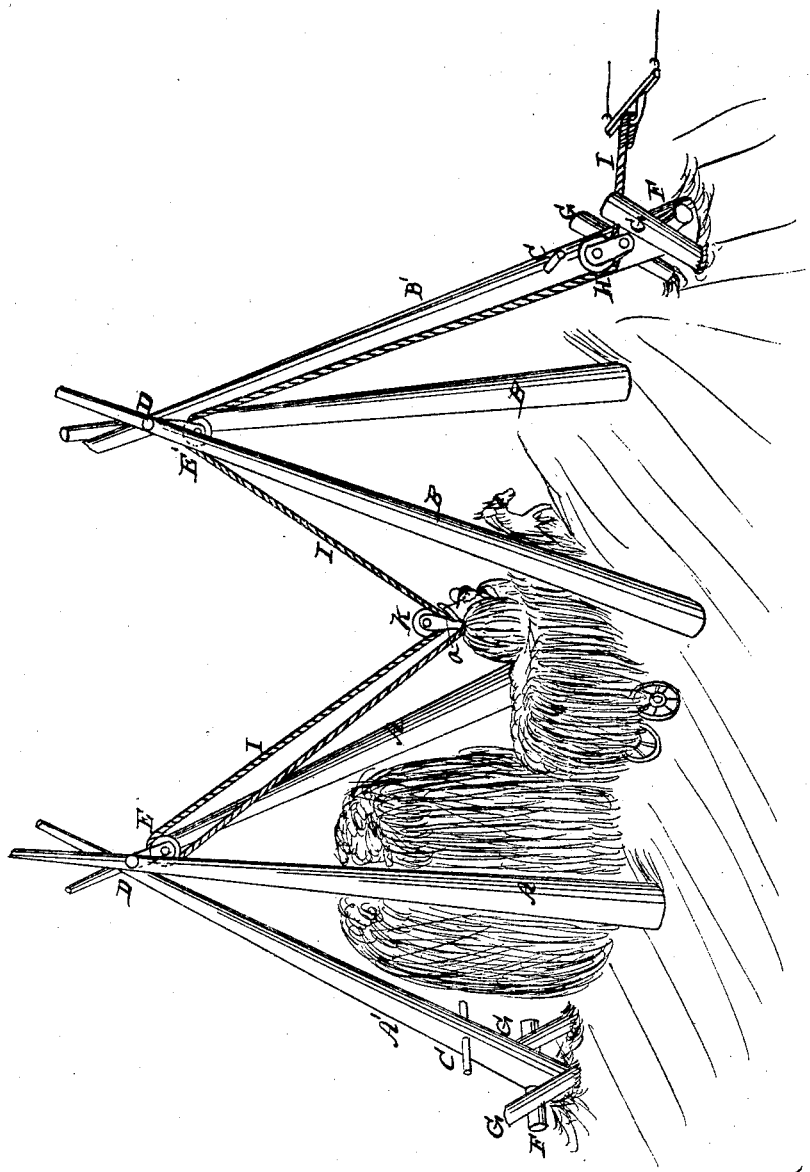
Witnesses
De Volson Wood.
A. A. Robinson
Inventor
William R. Waldron

United States Patent Office.

WILLIAM R. WALDRON, OF WEBSTER, MICHIGAN.

Letters Patent No. 65,316, dated May 28, 1867.

IMPROVEMENT IN DEVICE FOR UNLOADING AND STACKING HAY.

*The Schedule referred to in these Letters Patent and making part of the same.*

TO ALL WHOM IT MAY CONCERN:

Be it known that I, WILLIAM R. WALDRON, of the town of Webster, in the county of Washtenaw, State of Michigan, have invented a new and useful machine for unloading hay, to be called "Waldron's Hay Unloader;" and I do declare that the following is a full, clear, and exact description of the same, reference being had to the annexed drawings, making a part of this specification.

The object of this device is to unload hay from a wagon and raise it on to a stack, or to unload from the outside of a barn and deposit it on the inside.

To construct it, take three poles, A A A', so long that when they are placed in position for use, as shown in the figure, there will be room for the stack within and under them. Place the lower ends of the poles A A where they will be when raised in position, and bring the top ends together. Then place the top end of A' between them, and let it extend back from the others. While it lies in this position fasten them together by means of the bolt or pin, D, and secure the pulley E. To put it in position for use raise the poles at D and push up on the pins C and F. The lower end of A' is embedded a foot or two in the ground, and has a pin or round, $f$, passing through it a short distance above the ground. The inclined stakes, G G, are driven into the ground, so as to hold down the pin F. This forms a cheap and safe anchorage for the whole device. Three other poles, B B B', arranged and anchored in the same way, are placed directly opposite the former, and far enough from them to allow of the free passage of the load between them. The poles A' and B', which are anchored, should stand opposite the load. The poles B B B' may be shorter than the others. One end of the rope I is attached to the head of the fork at $a$, thence it passes around the pulley E, thence under the pulley K, which is attached to the head of the fork, thence over the pulley E', thence under the pulley H, and thence to the whiffle-tree, to which the horse or other power is attached.

To work the machine any ordinary horse-fork may be used and attached as above described. When the fork is loaded and the horse draws on the rope, the fork with its load will, at first, be raised nearly vertical, but afterwards will be drawn gradually towards E, and when K arrives near E it will be over the centre of the stack and the fork is tipped. The resistance of the air during the descent of the hay causes it to strike lightly upon the stack, and is in a position to be easily moved by the stack-maker. The reverse movement of the horse causes the fork to return to its former position, ready to repeat the operation. To remove the device the lower ends of A' and B' are carried directly away from the stack, thus drawing the tops of the other poles over until all are brought to the ground. For unloading in a barn the pulley E can be fastened within the barn, hence only one set of poles will be needed.

What I claim as my invention, and desire to secure by Letters Patent, is—

The combination of the poles, pulleys, rope and anchorage, when arranged substantially as herein described, and for the purposes herein set forth.

WILLIAM R. WALDRON.

Witnesses:
E. A. WALDRON,
W. N. GLEASON.